(12) United States Patent
Mou et al.

(10) Patent No.: US 9,440,350 B2
(45) Date of Patent: Sep. 13, 2016

(54) AUTOMATICALLY TRAVELLING DEVICE AND CONTROL METHOD THEREFOR

(71) Applicant: POSITEC POWER TOOLS (SUZHOU) CO., LTD., Suzhou (JP)

(72) Inventors: Guoliang Mou, Suzhou (CN); Jiaofeng Tian, Suzhou (CN); Xiaochu Sheng, Suzhou (CN); Hongbing Wu, Suzhou (CN); Dongjing Song, Suzhou (CN)

(73) Assignee: Positec Power Tools (Suzhou) Co., LTD, Suzhou, Jiangsu Province (CN)

( * ) Notice: Subject to any disclaimer, the term of this patent is extended or adjusted under 35 U.S.C. 154(b) by 0 days.

(21) Appl. No.: 14/382,441

(22) PCT Filed: Feb. 28, 2013

(86) PCT No.: PCT/CN2013/072003
§ 371 (c)(1),
(2) Date: Sep. 2, 2014

(87) PCT Pub. No.: WO2013/127350
PCT Pub. Date: Sep. 6, 2013

(65) Prior Publication Data
US 2015/0105904 A1    Apr. 16, 2015

(30) Foreign Application Priority Data

Mar. 2, 2012 (CN) .......................... 2012 1 0052428
Mar. 2, 2012 (CN) .......................... 2012 1 0052429
Jul. 26, 2012 (CN) .......................... 2012 1 0261668

(51) Int. Cl.
*G05B 19/04* (2006.01)
*H02J 7/00* (2006.01)
(Continued)

(52) U.S. Cl.
CPC ............ *B25J 9/0003* (2013.01); *A01D 34/008* (2013.01); *G05D 1/0225* (2013.01);
(Continued)

(58) Field of Classification Search
USPC ........................ 700/245, 253, 284, 246, 250; 318/568.12, 568.11; 320/107, 109, 320/110, 112; 901/1
See application file for complete search history.

(56) References Cited

U.S. PATENT DOCUMENTS 4,777,416 A    10/1988  George, II et al.
5,278,509 A    1/1994   Haynes et al.
(Continued)

FOREIGN PATENT DOCUMENTS

CN          1954974 A      5/2007
CN        201426049 Y      3/2010
(Continued)

OTHER PUBLICATIONS

International Search Report, International Application No. PCT/CN2013/072003, Jun. 6, 2013, three (3) pages.
(Continued)

*Primary Examiner* — Ronnie Mancho
(74) *Attorney, Agent, or Firm* — TraskBritt

(57) ABSTRACT

An automatic moving device and a control method therefor. The automatic moving device comprises a battery pack providing power. The automatic moving device can work within a working area and automatically return to a charging station for charging. The control method comprises the following steps: monitoring the power level of the battery pack; if the power level of the battery pack is less than or equal to a preset power level, initiating an action of returning the automatic moving device to the charging station; and after a preset time period, stopping the travel. By setting a preset time period simultaneously with initiating a return action, and executing a return action within the preset time period, the control method prevents damage to the battery pack from over-discharging caused by the automatic moving device continually returning, thus achieving the effects of protecting the battery pack and extending the life thereof.

20 Claims, 7 Drawing Sheets

(51) Int. Cl.
*B25J 9/00* (2006.01)
*A01D 34/00* (2006.01)
*G05D 1/02* (2006.01)
*A01D 69/02* (2006.01)

(52) U.S. Cl.
CPC ............ *H02J 7/0029* (2013.01); *A01D 69/02* (2013.01); *H02J 2007/004* (2013.01); *Y10S 901/01* (2013.01); *Y10S 901/49* (2013.01)

(56) References Cited

U.S. PATENT DOCUMENTS

| | | | |
|---|---|---|---|
| 5,490,370 A | 2/1996 | McNair et al. | |
| 7,133,746 B2 | 11/2006 | Abramson et al. | |
| 7,332,890 B2* | 2/2008 | Cohen | A47L 9/2857 320/109 |
| 2005/0010330 A1* | 1/2005 | Abramson | G05D 1/0225 700/245 |
| 2005/0231156 A1* | 10/2005 | Yan | G05D 1/0225 320/107 |
| 2005/0234595 A1 | 10/2005 | Tani | |
| 2011/0004342 A1* | 1/2011 | Knopow | A47L 5/28 700/253 |
| 2011/0166715 A1* | 7/2011 | Hoffman | A01G 25/16 700/284 |
| 2012/0167917 A1* | 7/2012 | Gilbert, Jr. | A47L 11/408 134/6 |
| 2014/0015493 A1* | 1/2014 | Wirz | H02J 7/025 320/137 |
| 2015/0105904 A1* | 4/2015 | Mou | H02J 7/0029 700/245 |

FOREIGN PATENT DOCUMENTS

| | | |
|---|---|---|
| EP | 1921523 A2 | 5/2008 |
| EP | 2 375 301 A2 | 10/2011 |
| EP | 2 413 215 A2 | 2/2012 |
| WO | 2011/090220 A2 | 7/2011 |

OTHER PUBLICATIONS

European Search Report for European Application No. 13754033.2 dated Jan. 19, 2016, 7 pages.

* cited by examiner

AUTOMATICALLY TRAVELLING DEVICE AND CONTROL METHOD THEREFOR

CROSS-REFERENCE TO RELATED APPLICATIONS

This application is a national phase entry under 35 U.S.C. §371 of International Patent Application PCT/CN2013/072003, filed Feb. 28, 2013, designating the United States of America and published in Chinese as International Patent Publication WO 2013/127350 A1 on Sep. 6, 2013, which claims the benefit under Article 8 of the Patent Cooperation Treaty and under 35 U.S.C. §119(e) to Chinese Application Serial Nos. 2012/10052429.6 2012, filed Mar. 2, 2012, 2012/10052428.1 2012, filed Mar. 2, 2012, and 2012/10261668.2 2012, filed Jul. 26, 2012, the disclosure of each of which is hereby incorporated herein in its entirety by this reference.

TECHNICAL FIELD

The invention relates to an automatic moving device, and more particularly, to an automatic moving device with over-discharging protection from a battery pack during the returning to charge process.

The invention also relates to a control method for the automatic moving device, and more particularly, to a control method of the automatic moving device, which performs over-discharging protection on the battery pack during the returning to charge process.

BACKGROUND

With the development of science and technology, intelligent automatic moving devices are increasingly well known. The automatic moving device can automatically perform related tasks according to preset procedures without manual operation and intervention. So, the automatic moving devices are widely used for industrial applications and house products, such as robots that perform all kinds of functions in industrial applications and in-house applications, such as products including lawn mowers, vacuum cleaners, etc. These intelligent automatic moving devices significantly save time, reduce labor intensity, thus improving the production efficiency and/or quality of life.

Automatic moving devices often use rechargeable battery packs as energy sources and can automatically return to their charging stations for charging. However, the battery pack may become damaged due to over-discharging. So, the energy for the automatic moving device of the battery pack is reduced to a relatively low preset level, but it starts the charging action of returning to the charging station when it does not reach the degree of over-discharging. The automatic moving device generally returns to the charging station before over-discharging. However, due to complicated environments in many working areas and some unexpected cases occurring in the working and returning, difficulties may occur when the automatic moving device returns to the charging station, leading it to continuous moving and damage due to battery pack over-discharging.

The other case is that some intermittent or seasonal working automatic moving devices can be used again after storing for a long time. For example, lawn mowers are often stored when they are not required for mowing in winter and are then used when the lawn is growing again in spring. In this case, the battery pack for automatic moving devices may be reduced to a very low energy level. This may be far less than the preset energy level at returning to charging. At this time, if the automatic moving device still performs the actions of search and returning to the charging station, it is also possible to become damaged due to over-discharging of the battery pack.

DISCLOSURE

The invention solves the technical problem of proving a controlling method of an automatic moving device to prevent damages due to over-discharging of the battery pack at automatic returning.

To solve the above technical problems, the technical scheme of the invention is:

A method for controlling an automatic moving device, wherein the automatic moving device comprises a battery pack for providing power and is adapted to operate in the work area and automatically return to the charging station for charging; the method comprising the following steps: monitoring the energy level of the battery pack; starting an action of making the automatic moving device to return to the charging station, if the energy level of the battery pack is less than or equal to a preset energy level; and stopping moving after a preset length of time.

Preferably, the method further comprises the following step: setting the preset length of time according to the monitored energy level.

Preferably, the step of setting the preset length further comprises the following sub-step: finding the difference between the monitored energy level and the preset energy level and setting the preset length of time according to the difference.

Preferably, the energy level of the battery pack is monitored by monitoring the voltage value of the battery pack; and determining that the energy level of the battery pack is less than or equal to the preset energy level if the voltage value of the battery pack is less than or equal to a preset voltage value.

Preferably, the preset length of time is set according to the monitored voltage value.

Preferably, the automatic moving device stops moving and starts charging after returning to the charging station within the preset length of time.

Preferably, the automatic moving device sends a charging reminder signal if the automatic moving device does not return to the charging station after the preset length of time.

Preferably, the step of making the automatic moving device to return to the charging station comprises the following steps: searching for a guidance signal related to the position of the charging station; and moving to the charging station according to the guidance signal.

Preferably, the guidance signal is an electrical signal on a charging guide line; the charging guide line is connected to the charging station and the step of making the automatic moving device return to the charging station comprises the following steps: searching for the electrical signal; traveling to the charging guide line and moving toward the charging station along the charging guide line according to the electrical signal.

Preferably, the automatic moving device performs a dust absorption task or a mowing task. There are several beneficial effects of the invention. First, by setting a preset length of time while starting a returning action and performing a returning action at the preset length of time, it avoids damages due to over-discharging of the battery pack in case of continuous returning of automatic moving devices, while reaching the effects of protecting the battery pack and extending its life. Then, by setting a specific value of the preset length of time based on the monitored energy level of the battery pack, it makes the returned length of time more exact and pertinent. It also allows it to take longer time to perform returning at a higher battery energy to increase the success rate of returning and to immediately stop returning at lower battery energy levels to avoid damages due to over-discharging of the battery pack. The invention solves the technical problem of proving an automatic moving device to prevent damages due to over-discharging of the battery pack at automatic returning.

To solve the above technical problems, the technical scheme of the invention is:

An automatic moving device, comprising: a driving module, which drives the automatic moving device to move, comprising a motor and wheels driven by the motor; a power module, which supplies energy for moving and working of the automatic moving device, comprising a battery pack and charging terminals connected to the battery pack; a control module, which connects to the driving module, controlling the working of the automatic moving device; a power-detecting unit, which detects the energy level of the battery pack and sends it to the control module, wherein: when the energy level of the battery pack is less than or equal to a preset energy level, the control module starts an action of making the automatic moving device return to the charging station; and after a preset length of time, the control module controls the automatic moving device to stop moving.

Preferably, the control module sets the preset length of time according to the monitored energy level.

Preferably, the control module finds a difference between the monitored energy level and the preset energy level, and sets the preset length of time according to the difference.

Preferably, the power-detecting unit monitors the energy level of the battery pack by monitoring the voltage of the battery pack; if the voltage value of the battery pack is less than or equal to a preset voltage value, then the control module determines that the energy level of the battery pack is less than or equal to the preset energy level accordingly.

Preferably, the control module sets the preset length of time according to the monitored voltage value.

Preferably, the control module controls the automatic moving device to stop moving and to charge after the automatic moving device returns to the charging station within the preset length of time.

Preferably, the control module controls the automatic moving device to send a charging reminder signal, if the automatic moving device does not return to the charging station after the preset length of time.

Preferably, the automatic moving device further comprises a guidance signal-sensing unit, the guidance signal-sensing unit senses a guidance signal related to the position of the charging station and the control module controls the driving module according to the guidance signal to make the automatic moving device move toward the charging station.

Preferably, the guidance signal is an electrical signal on a charging guide line and the charging guide line is connected to the charging station; the guidance signal-sensing unit senses the electrical signal; the control module controls the driving module to travel to the charging guide line and moves toward the charging station along the charging guide line according to the sensed electrical signal.

Preferably, the automatic moving device further comprises a working module, which the power module supplies with energy, to perform mowing tasks or dust absorption tasks.

There are several beneficial effects of the invention. First, the control module sets a preset length of time while starting a returning action and performing a returning action at the preset length of time, avoiding damages due to over-discharging of the battery pack in case of continuous returning of automatic moving devices, reaching the protection of the battery pack and delaying its life effects. In addition, the control module sets a specific value of the preset length of time based on the monitored energy level of the battery pack, making the returned length of time more exact and pertinent. This allows it to take longer time to perform, returning at higher battery energy to increase the success rate of returning and to immediately stop returning at lower battery energy to avoid damages due to over-discharging of the battery pack.

The invention solves another technical problem of providing a controlling method of an automatic moving device to prevent damages due to over-discharging of the battery pack at returning to charging.

To solve the above technical problems, the technical scheme of the invention is:

An automatic moving device contains a battery pack for power and can operate in the working area and automatically return to the charging station for charging, following several steps: power-on to detect the initial energy level of the battery pack after power-on of the automatic moving device. If the initial energy level of the battery pack is between the first preset energy level and the second preset energy level, start the action, which enables the automatic moving device to return the charging station. This allows the first preset energy level to be higher than the second preset energy level.

Preferably, the controlling method of the automatic moving device also includes the following step: after the preset length of time, the automatic moving device stops moving.

Preferably, the controlling method of the automatic moving device also includes the following step: according to the monitored energy level, set the preset length of time.

Preferably, setting the preset length of time includes the following sub-steps: find the difference between the detected initial energy level and the first preset energy level or the second preset energy level and set the length of time depending on the difference.

Preferably, detect the initial energy level of the battery pack by detecting the voltage values of the battery pack. If the voltage value of the battery pack is between the first preset voltage value and the second preset voltage value, it is determined accordingly that the initial energy level of battery pack is between the first preset energy level and the second preset energy level.

Preferably, set the preset length of time according to the detected voltage values of the battery pack.

Preferably, the automatic moving device stops moving and charging after returning to the charging station within the preset length of time.

Preferably, the automatic moving device sends the charging reminder signal if it does not return to the charging station after the preset length of time.

Preferably, the steps for controlling the automatic moving devices returning to the charging station include searching for the guidance signal related to the position of the charging station and moving to the charging station according to the guidance signal.

Preferably, the guidance signal is an electrical signal on the charging guide line, the charging guide line is connected to the charging station and the steps for controlling the automatic moving device to return the charging station follow a few steps. They include: searching for the electrical signal and, according to the electrical signal, traveling to the charging guide line and moving toward the charging station along the charging guide line.

Preferably, the automatic moving device performs the dust absorption task or mowing task.

Preferably, the initial energy level of the battery pack is detected when the automatic moving device performs work.

Preferably, the controlling method of the automatic moving device also includes the following step: if the initial energy level of the battery pack is less than the second preset energy level, control the automatic moving device to stop moving.

Preferably, the controlling method of the automatic moving device also includes the following step: if the initial energy level of battery pack is less than the second preset energy level, control the automatic moving device to send the charging reminder signal.

Preferably, the controlling method of the automatic moving device also includes the following step: if the initial energy level of the battery pack is higher than the first preset energy level, control the automatic moving device to stop moving.

Preferably, the controlling method of the automatic moving device also includes the following steps: when the automatic moving device works, monitor the energy level of the battery pack; if the energy level of the battery pack is less than the third preset energy level, start the action that enables the automatic moving device to return to the charging station. The third preset energy level is less than the first preset energy level, greater, and equal to the second preset energy level. After the preset length of time, the automatic moving device stops moving.

Preferably, the controlling method of the automatic moving device also includes the following step: according to the monitored energy level, set the preset length of time.

Preferably, the automatic moving device stops moving and charging after returning to the charging station within the preset length of time.

There are some beneficial effects of the invention. By determining the relationship between the initial energy level of the battery pack and the two preset voltages at the power-on self-test, it is realized that the returning action is started only when the initial energy of the battery pack is enough to avoid damages due to over-discharging of the battery pack. By setting a preset length of time while starting a returning action and performing a returning action at the preset length of time, it avoids damages due to over-discharging of the battery pack in case of continuous returning of automatic moving devices, reaching the protection of battery pack and delaying its life effects. By setting a specific value of the preset length of time based on the monitored energy level of the battery pack, it makes the returned length of time more exact and pertinent. It also allows it to take a longer time to perform by returning at a higher battery energy so as to increase the success rate of returning and to immediately stop returning at a lower battery energy to avoid damages due to over-discharging of the battery pack.

The invention solves another technical problem of proving an automatic moving device to prevent damages due to over-discharging of the battery pack at automatic returning.

To solve the above technical problems, the technical scheme of the invention is:

An automatic moving device is comprised of a driving module, which drives the automatic moving device and includes a motor and wheels driven by the motor. Then, there is a power module, which supplies moving and working of the automatic moving device with energy, including a battery pack and charging terminals connected to the battery pack. There is a control module, which connects with the moving device and controlling device for controlling the working of the automatic moving device. A power-detecting unit is also included, which detects energy levels of the battery pack and sends the energy levels to the controlling device. After power-on, the power-detecting unit detects the initial energy level of the battery pack; when the initial energy level of the battery pack is between the first preset energy level and the second preset energy level, the controller starts the action, which allows the automatic moving device to return the charging station.

Preferably, after the preset length of time, the automatic moving device stops moving.

Preferably, the controller sets the preset length of time according to the monitored energy level.

Preferably, the power-detecting unit detects the initial energy level of the battery pack by detecting the voltage of the battery pack. If the voltage value of the battery pack is between the first preset voltage value and the second preset voltage value, the controller determines accordingly that the initial energy level of battery pack is between the first preset energy level and the second preset energy level.

Preferably, the controller sets the preset length of time according to the detected voltage values.

Preferably, the automatic moving device stops moving and charging after returning to the charging station within the preset length of time.

Preferably, the automatic moving device will send the charging reminder signal if it does not return to the charging station after the preset length of time.

Preferably, the automatic moving device also includes a guidance signal-sensing unit, the guidance signal-sensing unit senses the guidance signal related to the position of the charging station and the control module controls the driving module according to the guidance signal to allow the automatic moving device to move toward the charging station.

Preferably, the guidance signal is the electrical signal on the charging guide line and the charging guide line is connected to the charging station. The guidance signal-sensing unit senses the electrical signal, the controller controls the driving module to travel to the charging guide line and moves toward the charging station along the charging guide line according to the sensed electrical signal.

Preferably, the automatic moving device also includes a working module, which the power module supplies with energy, for the automatic moving device to perfoini mowing or dust absorption.

Preferably, the power-detecting unit detects the initial energy level of the battery pack when the automatic moving device performs work.

Preferably, if the initial energy level of the battery pack is less than the second preset energy level, the controller controls the automatic moving device to stop moving.

Preferably, if the initial energy level of the battery pack is less than the second preset energy level, the controller controls the automatic moving device to send the charging reminder signal.

Preferably, if the initial energy level of the battery pack is higher than the first preset energy level, the controller controls the automatic moving device to start working.

Preferably, the power-detecting unit monitors the energy level of the battery pack when the automatic moving device works. If the energy level of the battery pack is lower than the third preset energy level, the controller starts the action that enables the automatic moving device to return to the charging station. The third preset energy level is less than the first preset energy level, and the third preset energy level is greater than the second preset energy level. After the preset length of time, the automatic moving device stops moving.

Preferably, the automatic moving device stops moving and charging after returning to the charging station within the preset length of time.

There are several beneficial effects of the invention. The control module determines the relationship between the initial energy level of the battery pack and the two preset voltages at the power-on self-test to realize that the returning action is started only when the initial energy of the battery pack is enough to avoid damages due to over-discharging of the battery pack. The control module sets a preset length of time while starting a returning action and performing a returning action at the preset length of time, avoiding damages due to over-discharging of the battery pack in case of continuous returning of automatic moving devices, reaching the protection of battery pack and delaying its life effects. The control module sets a specific value of the preset length of time based on the monitored energy level of the battery pack. This makes the returned length of time more exact and pertinent, allowing it to take longer time to perform returning at higher battery energy so as to increase the success rate of returning and to immediately stop returning at lower battery energy to avoid damages due to over-discharging of the battery pack.

The invention solves the technical problem of proving a controlling method of an automatic moving device to prevent damages due to over-discharging of the power sources at automatic returning.

To solve the above technical problems, the technical scheme of the invention is an automatic moving device that contains a power module for power. Its controlling method for returning to the docking station is comprised of several steps: control the automatic moving device to start returning and detect the energy level of the automatic moving device; calculate the rate of change on the energy level of the power module; and when the absolute value of the changing rate of the energy level reaches or exceeds the preset threshold value, control the automatic moving device to stop returning.

Preferably, the controlling method also includes steps for setting the preset threshold values.

Preferably, set the preset threshold values depending on at least one parameter in the power source type, load level or discharging temperature.

Preferably, the changing rate of the energy level is first derivatives, second derivatives or higher derivatives on the energy level to time.

Preferably, the energy level of the power source is indicated by the power source voltage or/and discharging current.

Preferably, the power source includes the battery pack having at least one cell, and the energy level of the power source is an energy level of the whole battery pack or one of the energy levels of the at least one cell.

Preferably, when the energy level of the power source is less than the preset energy level, control the automatic moving device to start returning.

Preferably, when the absolute value of the changing rate of the energy level for the power source is less than the preset threshold value, drive the automatic moving device to move toward the docking station.

Preferably, in the process of driving the automatic moving device to move toward the docking station, when the automatic moving device returns to the docking station, control the automatic moving device to stop returning.

Preferably, there are two steps for driving the automatic moving device to move toward the docking station. First, search for the guidance signal related to the position of the docking station. Then, drive the automatic moving device to move toward the docking station according to the guidance signal.

Preferably, the guidance signal is the electrical signal on the guide line and the guide line is connected to the docking station. There are two steps for driving the automatic moving device to move toward the docking station. Search for the electrical signal, then move to the guide line and drive the automatic moving device to move toward the docking station along the guide line according to the electrical signal.

Preferably, the automatic moving device performs the dust absorption task or the mowing task.

There are several beneficial effects of the invention. By learning the changing rate of the energy level for power source in real time, and determining that the rate of change reaches or exceeds the preset threshold values in the process of returning, it is realized that the automatic moving device is controlled properly to stop returning to avoid damages due to over-discharging of power source in case of the automatic moving device's continuous returning. This achieved the effects of protecting the power source and extending its life.

The invention solves another technical problem of protecting an automatic moving device to prevent damages due to over-discharging of the power sources at automatic returning.

To solve the above technical problems, there are several technical schemes of the invention. There is an automatic moving device, which can selectively return to the docking station. There is also a driving module, which drives the automatic moving device to move. A power source supplies the automatic moving device with energy. A power-detecting unit detects energy level of the power source. The control module obtains the energy level of the current power source by the power-detecting unit, and controls the operating status of the driving module. The control module controls the driving module to drive the automatic moving device to return to the docking station. The control module calculates the changing rate of the energy level on the power source based on the energy level of the current power source. When the absolute value of the changing rate of the energy level reaches or exceeds the preset threshold value, the control module controls the automatic moving device to stop moving.

Preferably, the control module sets the preset threshold values in the working process.

Preferably, the automatic moving device also includes a type identification unit identifying the power source and the control module sets the preset threshold values depending on the signal transferred by the type identification unit.

Preferably, the automatic moving device also includes a load-detecting unit for detecting load levels of the power source and the control module sets the preset threshold values transferred by the load-detecting unit.

Preferably, the power-detecting unit detects the discharging temperature of the power module and the control module sets the preset threshold values based on the signal transferred by the power-detecting unit.

Preferably, the changing rate of the energy level is first derivatives, second derivatives or higher derivatives on the energy level to time.

Preferably, the energy level of the power source is indicated by the power source voltage and/or discharging current.

Preferably, the power source includes the battery pack having at least one cell, and the energy level of the power source is an energy level of the whole battery pack or one of the energy levels of the at least one cell.

Preferably, when the control module determines that the energy level of the current power source is less than the preset energy level, the control module controls the driving module to drive the automatic moving device to return to the docking station.

Preferably, when the control module determines that the absolute value of the changing rate of the energy level for power source is less than the preset threshold value, the control module controls the driving module to drive the automatic moving device to move toward the docking station.

Preferably, in the process of the automatic moving device's moving toward the docking station, when the control module determines the automatic moving device has returned to the docking station, the control module controls the driving module to stop moving.

Preferably, the automatic moving device also includes a guidance signal-sensing unit, the guidance signal-sensing unit senses the guidance signal related to the position of the docking station and the control module controls the driving module according to the guidance signal to drive the automatic moving device to move toward the docking station.

Preferably, the guidance signal is the electrical signal on the guide line and the guide line is connected to the docking station. The guidance signal-sensing unit senses the electrical signal, the control module controls the driving module to travel to the guide line and drive the automatic moving device to move toward the docking station along the guide line according to the sensed electrical signal.

Preferably, the automatic moving device also includes a working module, which performs the mowing or dust absorption.

There are several beneficial effects of the invention. The control module learns the changing rate of the energy level for power source in real time. It also determines that the rate of change reaches or exceeds the preset threshold values in the process of returning to realize that the automatic moving device is controlled properly to stop returning to avoid damages due to over-discharging of the power module in case of the automatic moving device's continuous returning. This achieves the effects of protecting the power source and extending its life.

BRIEF DESCRIPTION OF THE DRAWINGS

The above technical problems solved by the invention, the technical scheme and beneficial effects can be obtained clearly by the following detailed description that can realize the better embodiment for the invention combined with the drawing descriptions.

The same reference numerals in the drawings are used to represent the same or identical components.

DETAILED DESCRIPTION

The detailed description and technical details of the invention, along with the accompanying drawings, are as follows. The drawings are only for reference and description and not for limitation of the invention.

Figure 1:
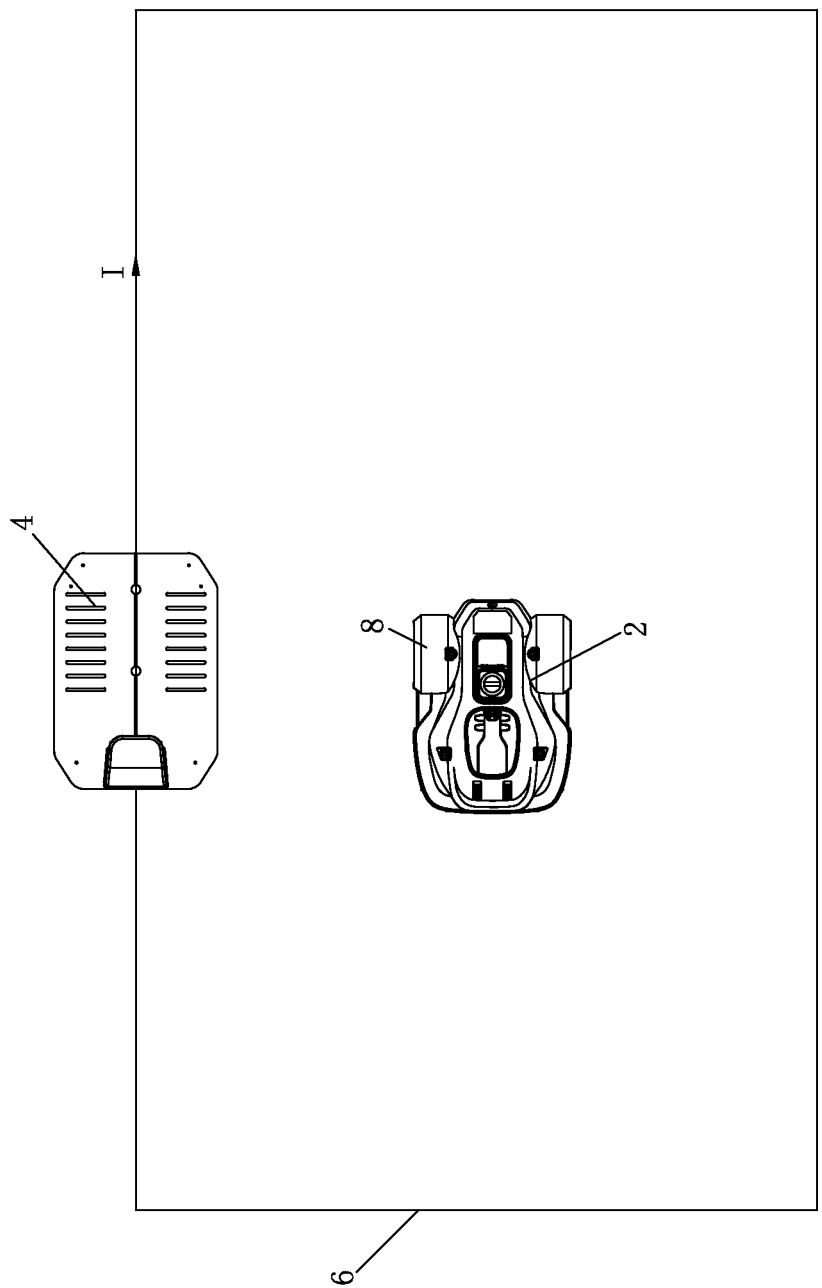
FIG. 1 is a schematic drawing of the working system of an automatic moving device in an embodiment of the invention.

FIG. 1 shows a schematic drawing of the working system of the automatic moving device in an embodiment of the invention. The working system of the automatic moving device includes the automatic moving device 2, charging station 4 and charging guide line 6 for a guidance signal-transmitting unit at returning and connecting with the charging station 4. In this implementation example, the charging guide line 6 is drawn out from the charging station 4 and returned to charging station 4 after making a loop around the operating range of the automatic moving device 2 and forming a boundary line for the working system of the automatic moving device 2. The working area is within the area enclosed by the charging guide line 6 and the non-working area is outside the area enclosed by the charging guide line 6.

Figure 2:
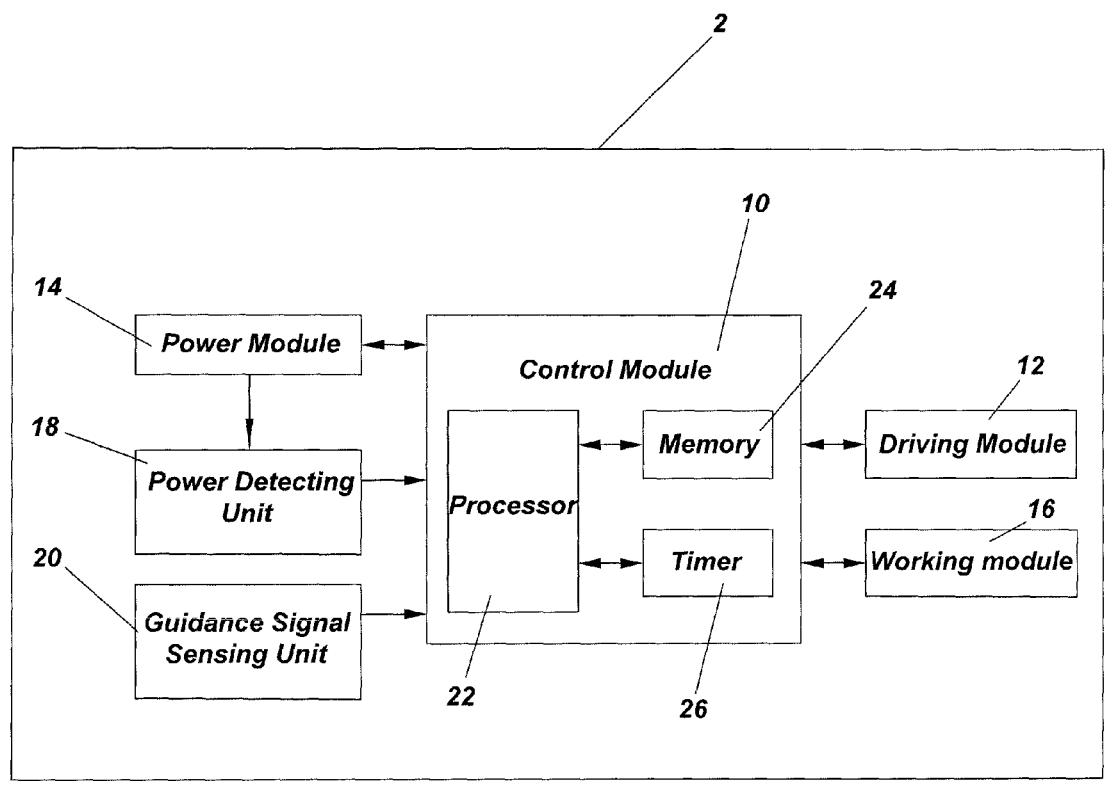
FIG. 2 is a module drawing of the automatic moving device shown in FIG. 1.

As shown in FIG. 2, the automatic moving device 2 mainly includes control module 10, driving module 12, power module 14, working module 16, power-detecting unit 18 and guidance signal-sensing unit 20.

The control module 10 is a control center of the automatic moving device 2 and connects with other modules, receives messages from other modules and controls all kinds of actions or tasks such as performing moving, working, returning to the charging station 4 and charging, etc. The control module 10 includes processor 22, memory 24, timer 26, etc., and the detailed results and functions are described subsequently.

The driving module 12 includes a motor located within the automatic moving device 2 and a wheel 8 (FIG. 1) driven by the motor, and is used for accepting commands from the control module 10. The power supplied by the power module 14 drives the automatic moving device 2 to move on the ground or on another working surface. In this implementation example, the driving module 12 includes two driving wheels at both sides of the automatic moving device 2, connecting the two drive motors on the two driving wheels and one or two support wheels on the front of the automatic moving device 2. This setting can control the speed and direction of the driving module 12 by controlling the speed and speed difference of the two drive wheels, making the moving and steering of the automatic moving device 2 flexible and accurate. The driving module 12 can have other constitution forms, e.g., it can be either driving a wheel or an individual drive motor and individual steering motor connecting with it; it can be in other forms, such as a crawler.

The working module 16 is used to perform detailed tasks by the automatic moving device 2. The working module 16 usually includes the working motor and working units driven by the working motor. If the automatic moving device 2 is a vacuum cleaner, the working unit has dust absorption parts for performing dust absorption task. These include a dust collection port, a fan, and a vacuum chamber. If the automatic moving device 2 is a lawn mower, then the working unit is a cutting part, which performs cutting for the working unit, such as an output shaft, cutter, blades, etc. Repetitious details on the output shaft, cutter, blades, etc., need not be given here.

The power module 14 supplies each module of the automatic moving device 2 with energy for working and includes a rechargeable battery pack and the charging terminals connecting with the battery pack. The charging terminal is used to match with the power terminal on the charging station 4 to connect onto the external power and supplement energy for the battery pack. The power sources module 14 can also be other rechargeable devices, such as rechargeable devices containing super capacitors. In this embodiment, the power module 14 is a battery pack with seven lithium battery cells, with 28 V rated voltage and 2000 mAh rated capacity.

The power-detecting unit 18 connecting the power module 14 and the control module 10 is used to detect the energy levels of the battery pack in the power module 14 and sends a signal indicating the energy levels to the control module 10. In this implementation example, the power-detecting unit 18 detects the energy levels in the battery pack by detecting the voltage in the battery pack. For example, the power-detecting unit 18 is the voltage-detecting circuit of the battery pack and sends the signal indicating the voltage value to the control module 10 after detecting the voltage values of the battery pack. Certainly, the power-detecting unit 18 can detect the energy levels of the battery pack in a direct or indirect way, e.g., detect the residual capacity, discharging current, discharging time, discharging temperature of the battery pack. The power-detecting unit 18 can detect the energy levels of the whole battery pack, the energy levels of the battery cells and simultaneously detect both of them, in which the energy level of the battery cell can be the energy level of one battery cell, of some battery cells, or of each battery cell. All embodiments of the energy levels for the battery pack are well known by the technicians in this field, which need not be given here.

The guidance signal-sensing unit 20 and the external guidance signal-transmitting unit of the automatic moving device 2 forms a returning guidance system, which is used to guide the automatic moving device 2 to return to the charging station 4.

In this implementation example, the guidance signal-transmitting unit includes an electrical signal generator and the charging guide line 6. The electrical signal generator is preferably an electrical signal generator that separates with the automatic moving device 2, and an electrical signal generator that connects the charging guide line 6. The electrical signal generator sends electrical signal I to the charging guide line 6 as a guidance signal guiding the automatic moving device 2 to move toward the charging station 4, as shown in FIG. 1. The signal generator is preferably integrated in the charging station 4. The guidance signal-sensing unit 20 is preferably one or more inductance on the automatic moving device 2. The charging guide line 6 carries variable current signal I, which will generate a correspondingly changing magnetic field around it, but the induction senses the signal of the charging guide line 6 by sensing the changing magnetic fields in the sensing space and transfers the sensed signal to the control module 10. The control module 10 analyzes all characteristics of the sensed signal, such as sensing time, signal strength, signal interval, etc., and determines the relative position of the automatic moving device 2 to the charging guide line 6 and the distance therefrom. In this way, when returning is required, the control module 10 sends the commands to the driving module 12. Then, based on the obtained information, the control module 10 sends a command to the driving module 12 to make it drive the automatic moving device 2 to travel near the charging guide line 6 or above the charging guide line 6, so as to return to the charging station 4 along the charging guide line 6.

The returning guidance system can also have other implementations. The guidance signal-transmitting unit can be an ultrasonic transmitter, and the guidance signal-sensing unit 20 can be a corresponding ultrasonic sensing unit. The returning guidance system locates the position of the charging station 4 by ultrasonic waves and the guided automatic moving device 2 returns to the charging station 4. The guidance signal-transmitting unit can be an infrared transmitter, and the guidance signal-sensing unit 20 can be a corresponding infrared-sensing unit. The returning guidance system locates the position of the charging station 4 by infrared light and the guided automatic moving device 2 returns to the charging station 4. The guidance signal-transmitting unit can also be an image collector installed on the automatic moving device 2. The guidance signal-sensing unit is a pattern recognition device that determines the guidance signal related to the position of the charging station 4 according to image information collected by the image collector. The guidance signal-transmitting unit can also be a GPS satellite, and the guidance signal-sensing unit is a GPS chip installed on the automatic moving device 2, which determines the position of automatic moving device 2 relative to the charging station 4 to determine the guidance signal relative to the position of the charging station 4.

Thanks to the collaboration of the above-described various parts, the invention realizes the returning charging and the over-discharging protection of the battery pack in the returning charging by means of the process described below or the methods.

Figure 3:
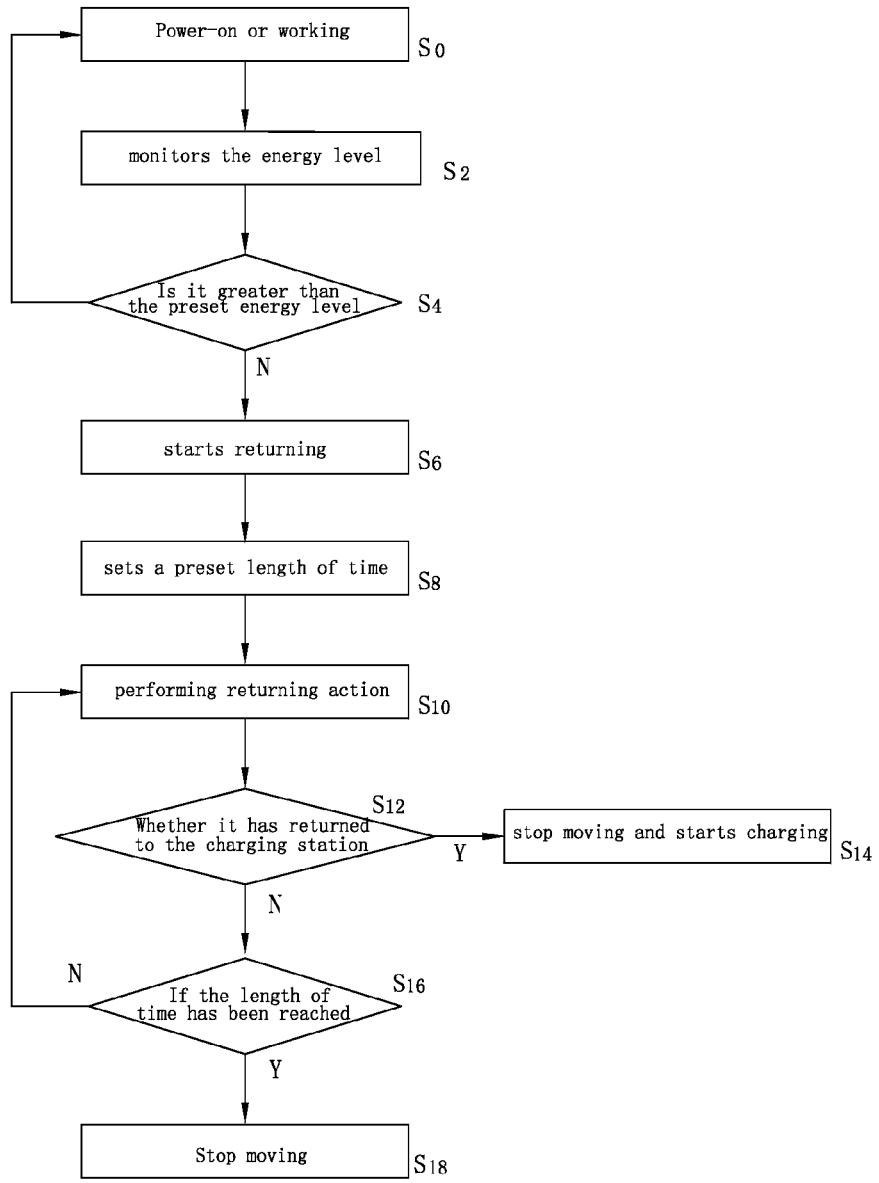
FIG. 3 is a flow diagram of a first working process of an embodiment of the invention.

Referring to FIG. 3, the first working process of the invention is particularly suitable for determination, implementation of the return-to-charge action and battery pack protection during the working, and is also used at power-on, i.e., determination, implementation of the return-to-charge action and battery pack protection at first start-up.

In the initial step $S_0$, the automatic moving device 2 starts up or has been at work.

Going to $S_2$, the control module 10 monitors the energy level of the battery pack by the power-detecting unit 18. As mentioned previously, in this implementation example, the detection of power detects the voltage of the battery pack representing the energy levels of the battery pack and sends it to the control module 10.

Then, in $S_4$, the control module 10 determines that the energy level of the battery pack is greater than the preset energy level. The preset energy level is pre-stored in the memory 24 of the control module 10. The processor 22 of the control module 10 compares the preset energy level and the energy level of the battery pack. If the energy level of the battery pack is greater than the preset energy level described, go to $S_0$, the automatic moving device 2 continues to work and does not perform other actions. Alternatively, if the energy level of the battery pack is not greater than the preset energy level described, go to $S_6$ and start the action, which allows the automatic moving device 2 to return to the charging station. Specific to this implementation example, because the voltage of the battery pack expresses the energy level of the battery pack, the voltage stored in the memory 24 is a preset voltage value. The processor 22 determines degree relations between the preset energy level and the energy level of the detected battery level by comparing the degree relations between the voltage value of the battery pack and the preset voltage described. Additionally, in this implementation example, the process goes to $S_6$ when the energy level of the battery pack equals the preset energy level, but it is practicable that the process goes to $S_2$.

After the control module 10 determines that the energy level of the battery pack is lower than the preset energy level, the automatic moving device 2 usually stops the operation of the working module 16 in the process of the returning to save energy.

After going to $S_6$, the automatic moving device 2 starts the returning action. For example, it starts returning to the charging station 4. The step following $S_6$ is $S_8$; the automatic moving device 2 sets a preset length of time and starts timing after starting the returning action. $S_6$ is before $S_8$ in this procedure. The technicians in this field can understand that there is no strict order between $S_6$ and $S_8$ and their order can be exchanged or it is considered that they can be performed simultaneously.

The preset length of time described is a fixed value, which is pre-stored in the memory 22, such as 20 minutes. In $S_8$, the processor 22 reads the preset length of time from the memory 24 and commands the timer 26 to start timing according to the preset length of time.

In this implementation example, provided that the energy level of the battery pack is less than or equal to the preset energy level, regardless of the difference between this energy level and the preset energy level, the preset length of time is certain. However, in other optional embodiments, the preset length of time can also be a changing value and the control module 10 can set the preset length of time according to the monitored energy level of the battery pack. Preferably, the control module 10 can calculate the preset length of time based on the difference between the detected energy level and the preset energy level, or directly based on the energy level of the battery pack, and there is no essential distinction between both. In this implementation example, because the voltage of the battery pack expresses the energy level of the battery pack, practically, the control module 10 can set the preset length of time according to the voltage values of the battery pack. It can set the preset length of time, preferably, based on the difference between the detected voltage and the preset voltage value. For example, if the detected battery pack voltage value is 22 V and the preset voltage value is 23 V, the preset length of time is 20 minutes. If the detected battery pack voltage value is 21 V, the preset length of time is 18 minutes accordingly, and so on. It is easy to think that the corresponding relation between the preset length of time and the detected voltage value or the aforementioned difference can be obtained by a formula and can be directly set by the comparison table pre-stored in the memory 22.

After starting the returning action, the automatic moving device 2 goes to $S_{10}$ that is, performing returning action and returning to the charging station. The automatic moving device 2 searches the guidance signal related to the position of the charging station 4 by the guidance signal-sensing unit 20 and moves to the charging station 4 according to the guidance signal. As mentioned previously, the guidance signal-sensing unit 20 moves toward the charging guide line by sensing the surrounding magnetic signal generated by the electrical signal on the charging guide line 6, and then moves toward the charging station 4 along the charging guide line 6.

After performing $S_{10}$, the control module 10 determines whether the automatic moving device 2 successfully returns to the charging station 4, in $S_{12}$. It then, preferably, determines that the charging terminals on the automatic moving device 2 are connected with the power terminal on the charging station 4. Usually, the determination is realized by monitoring that the charging terminals described receive the external voltages or signal. The determination can be performed by other ways such as position sensor, crash sensor. If the result is "Yes," that is, the automatic device 2 returns the charging station 4, go to $S_{14}$, the control module 10 controls the automatic moving device 2 to stop moving and starts charging. If the result is "No," go to $S_{16}$.

$S_{16}$ determines whether the length of time has been reached. If the determined result of $S_{16}$ is "No," return to $S_{10}$ and continue to perform the action of returning to the charging station. If the result is "Yes" and the preset length of time has reached, go to $S_{18}$ and the automatic moving device 2 stops moving. Preferably, the control module 10 controls the driving module 12 to stop working.

In the first working process, whenever the automatic moving device 2 successfully returns to the charging station 4, it stops moving after the preset length of time. That is, if the automatic moving device 2 returns to the charging station 4 within the preset length of time, it will stop moving in the charging station 4 and perform charging. If the automatic moving device 2 cannot return to the charging station 4 within the preset length of time, it will also stop moving. This working process avoids both the automatic moving device 2 continuously searching for the charging station 4 when it cannot successfully return and damage due to over-discharging of the battery pack.

Preferably, when the determined result of $S_{16}$ is "Yes," the control module 10 also controls the automatic moving device 2 to send a charging reminder signal to remind users that the automatic moving device 2 needs returning to the charging station 4 with manual assistance. The charging reminder signal can be graphic information displayed on the display panel of the automatic moving device 2, a special alarm sound signal, or information on other devices for the remote wireless from the user, such as short messages or other reminders sent to the users' mobile phone via a mobile network, etc.

By the first working process as described above, the automatic moving device 2 can start returning in good time to power-up and work, according to the energy levels of the battery pack as well as perform the over-discharging protection on the battery pack during the returning.

Figure 4:
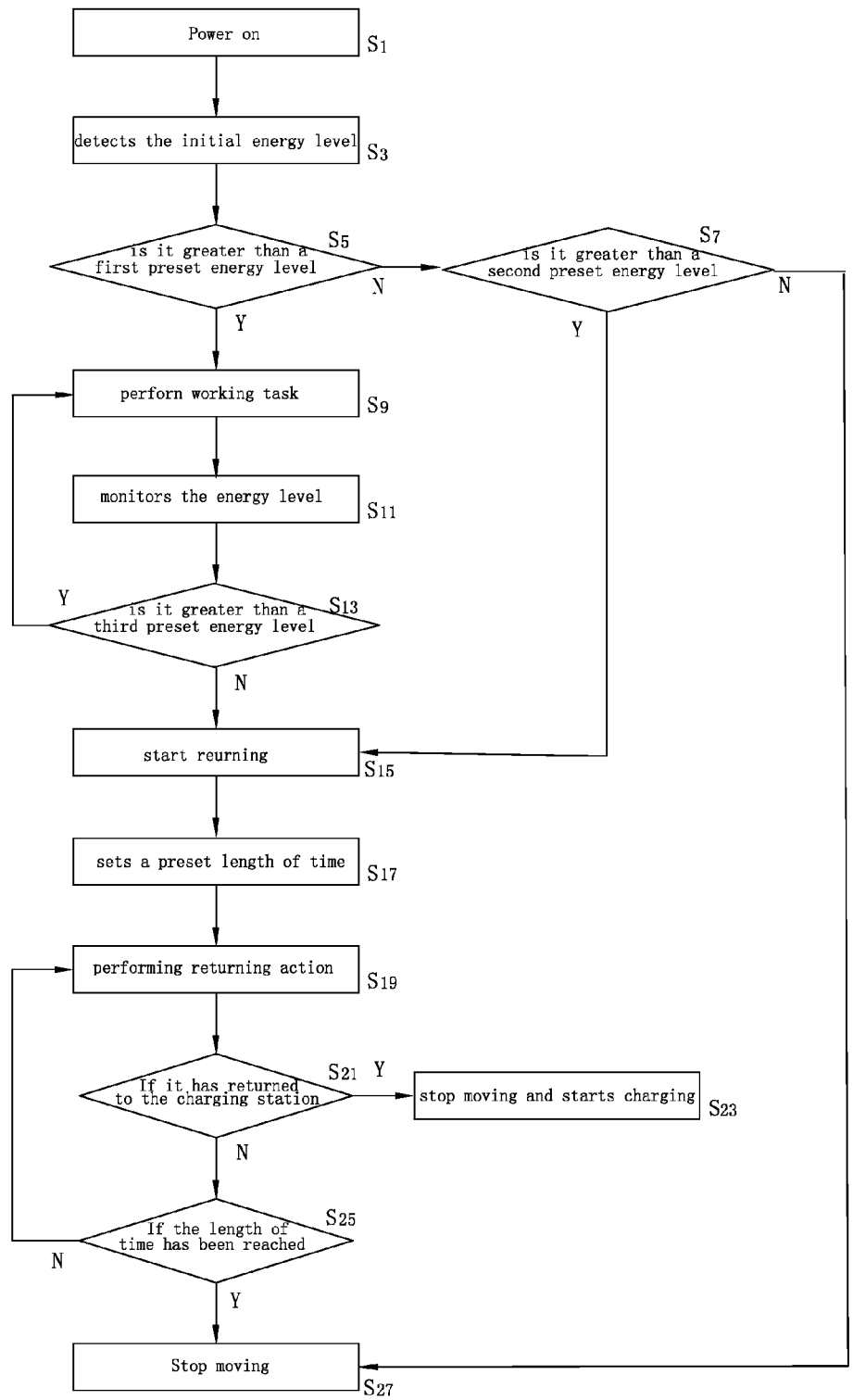
FIG. 4 is a flow diagram of a second working process of an embodiment of the invention.

The following introduces the second working process of this invention with the help of FIG. 4. In the second working process, the two cases of power-up and working are distinguished and determination of returning and protection of the battery pack are performed for their specific circumstances. The second working mode is especially suitable for the case that the automatic moving device 2 is stored for a long time and it is restarted after the voltage is significantly reduced due to self-discharging of the battery pack.

In the initial step $S_1$, the automatic moving device 2 starts up, i.e., it is recovered from power off or sleep state to power-on state. Then go to $S_3$, the power-detecting unit 18 detects the initial energy level of the battery pack and sends it to the control module 10.

The initial energy level of the battery pack can be detected when the main power-consumption parts of the automatic moving device 2, the driving module 12 and working module 16 have not worked. In this implementation example, because it detects the energy level of the battery pack by means of measuring voltage, the automatic moving device 2 detects the initial energy level of the battery pack at work or under normal loads to prevent virtual-high voltage values of the battery pack without working. Preferably, the automatic moving device 2 first starts the driving module 12 and working module 16 for a few seconds at start-up, detects the voltage values of the battery pack and sends the values to the control module 10.

After the control module 10 receives signals representing the initial energy level of the battery pack, perform $S_5$ to determine that if the energy level of the battery pack is greater than the first preset energy level. If the initial energy level of the battery pack is greater than the preset energy level, go to $S_9$. The control module 10 controls the automatic moving device 2 for working. For example, the driving module 12 drives and the working module 16 performs the preset task.

Alternatively, if the initial energy level of the battery pack is not greater than the preset energy level, go to $S_7$ and continuously determine that the initial energy level of the battery pack is greater than the second energy level and the second preset energy level is less than the first preset energy level.

If the determined result of $S_7$ is "No" and the initial energy level of the battery pack is not greater than the second preset energy level, the process jumps to $S_{27}$. The control module 10 controls the automatic moving device 2 to stop moving and at this time the automatic moving device 2 cannot usually perform other working tasks. If the determined result of $S_7$ is "Yes" and the initial energy level of the battery pack is greater than the second preset energy level, go to $S_{15}$, the automatic moving device 2 starts returning action.

In $S_5$ and $S_7$, the detailed determination procedure of the initial energy level is similar to the first working mode. Because the voltage of the battery pack is detected by the power-detecting unit, the initial energy level, the first preset energy level and the second energy level are indicated by the initial voltage value of the battery pack, the first preset voltage value and the second preset voltage value. The first preset voltage value and the second preset voltage value are pre-stored in the memory 24 of the control module 10 and the processor 22 of the control module 10, which determines the relation between the initial energy level of the battery pack and the first preset voltage value or the second preset voltage value.

The automatic moving device 2 has three following actions based on the initial energy levels of the battery pack at start-up by the above process setting. If the initial energy level of the battery pack is greater than the first preset energy level, it indicates that the initial energy of the battery pack is enough, the automatic moving device 2 performs the first follow-up action, then, go to $S_9$ for normal start. The control module 10 commands the automatic moving device 2 to perform working, i.e., performing the preset tasks or other commands received. If the initial energy level of the battery pack is between the first preset energy level and the second preset energy level, i.e., less than the first preset energy level and greater than the second preset energy level, this indicates that the initial energy of the battery pack is not enough and requires supplemental energy. The automatic moving device 2 will then perform the second follow-up action. Go to $S_{15}$ for performing the action of returning to the charging station 4. If the initial energy level of the battery pack is less than or equal to the second preset energy level, indicating the initial energy of the battery pack has a serious shortage, it is not proper to perform work and the actions of returning to the charging station 4. Therefore, the automatic moving device 2 performs the third follow-up action and performs $S_{27}$, and the control module 10 commands the automatic moving device 2 to stop moving. This can effectively avoid starting the returning process when the energy of the battery pack is too low, and thus avoid damages due to over-discharging of the battery pack.

When performing the first follow-up actions, the automatic moving device 2 goes from $S_5$ to $S_{15}$, and then goes to $S_{27}$ according to the follow-up procedure of $S_{15}$. Starting from $S_9$ through $S_{27}$, the working process of the automatic moving device 2 is in general accord with the first working procedure described above.

After $S_9$, the automatic moving device 2 goes to $S_{11}$ and monitors the energy level of the battery pack. In $S_{13}$, it is determined that the energy level of the battery pack is greater than the third preset energy level and the third preset energy level is less than or equal to the first preset energy level but is greater than the second preset energy level. The third preset energy level is indicated by voltage value and is pre-stored in the memory 24. If the determined result of $S_{13}$ is "Yes," return to $S_9$ to continue to perform working; if the determined result is "No," go to $S_{15}$ to start the returning action. In $S_{17}$, the automatic moving device 2 sets a preset length of time and starts timing from starting the returning actions via the timer 26; after $S_{17}$, the process goes to $S_{19}$ and the automatic moving device 2 performs the returning action. After $S_{19}$, in $S_{21}$, the control module 10 determines that the automatic moving device 2 has returned to the charging station 4. If the result is "Yes," go to $S_{23}$, the automatic moving device 2 stops moving and performs charging. If the result is "No," go to $S_{25}$, and then determine that the action for performing the returning action has reached the preset length of time. If the determined result of $S_{25}$ is "No," the process returns to $S_{19}$ to continue to perform the returning action. If the determined result of $S_{25}$ is "Yes," go to $S_{27}$, the automatic moving device 2 stops moving.

When performing the second follow-up actions, the automatic moving device 2 goes from $S_7$ to $S_{15}$, and then goes to $S_{27}$ according to the follow-up procedure of $S_{15}$. In this case, it is particularly advantageous to set the preset length of time according to the initial energy level of the battery pack or the initial voltage value detected in $S_3$. In the first working process, if the energy of the battery pack detected in the working process and the energy level of the battery pack are reduced gradually from the high point, the energy level of the battery pack usually equals to or is slightly lower than the preset energy level when the automatic moving device 2 starts returning. Therefore, it is practicable to set a fixed preset length of time. However, as described in the second working process, in the process starting from the startup action, the energy level may be much lower than the first preset energy level due to self-discharging of the battery pack. At this time, the preset working time can be set according to the initial energy level or the initial voltage of the battery pack or the real safe operating item of the battery pack to avoid damages due to over-discharging of the battery pack.

Starting from $S_{15}$, the process of the automatic moving device 2 is the same as that of the process of the first follow-up action starting from $S_{15}$, i.e., starting returning and sets one preset length of time and starts timing; if the preset length of time has reached, stops moving. The detailed process need not be given here.

Similar with the first working process, in the returning relative process of the first follow-up action and the second follow-up action, whenever the automatic moving device 2 returns to the charging station 4 successfully, it stops moving at the preset length of time. That is, if the automatic moving device 2 returns to the charging station 4 within the preset length of time, it will stop moving in the charging station 4 and perform charging. If the automatic moving device 2 cannot return to the charging station 4 within the preset length of time, it will be also stop moving. This working process avoids both the automatic moving device 2 continuously searching for the charging station 4 when it cannot successfully return and damages due to over-discharging of the battery pack.

When performing the third follow-up action, the automatic moving device 2 directly goes to $S_{27}$, stops moving and waits for the user to perform charging with manual assistance. Similar with the first working process described above, the automatic moving device 2 can also send a charging reminder signal.

By the two working processes described above, the automatic moving device 2 in this invention can automatically return to the charging station for charging in case of insufficient energy, avoiding damages due to discharging of the battery pack in the returning.

Figure 5:
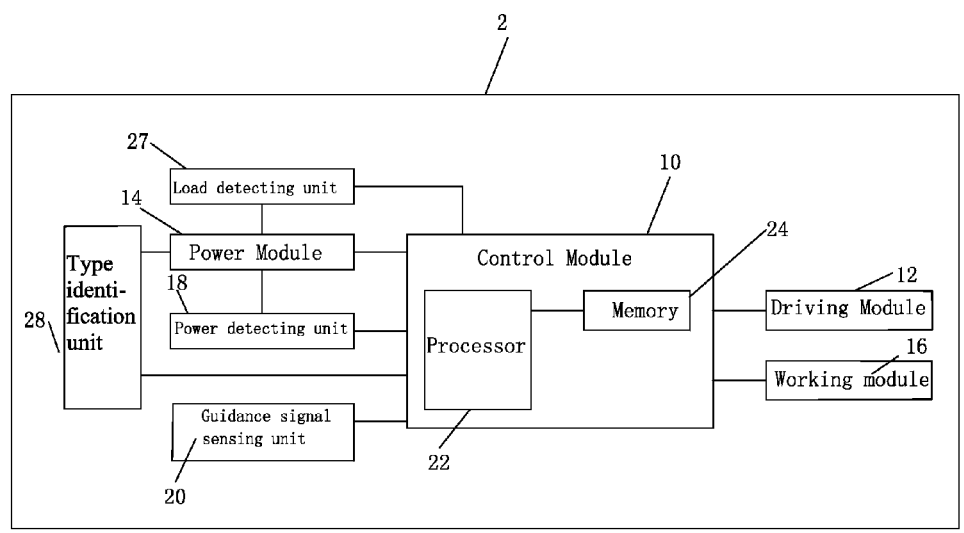
FIG. 5 is a module drawing of another embodiment for the automatic moving device shown in FIG. 1.

Referring to FIG. 5, in some other implementation of the invention, the automatic moving device 2 mainly includes the control module 10, the driving module 12, power module 14, working module 16, power-detecting unit 18, guidance signal-sensing unit 20, load-detecting unit 27 and type-identification unit 28.

The load-detecting unit 27 connects the power module 14 and the control module 10 and is used to detect the load levels of the power module 14, i.e., the automatic moving device 2's consumption state of the energy of the power module 14. The load levels of power module 14 are identified by detecting the discharging current, discharging voltage, discharging temperature of the power module 14. Specific to this implementation, the load-detecting unit 27 detects the discharging currents of the power module 14 and transfers the detected discharging current values to the control module 10 in real time, which is easy for the control module 10 to perform the corresponding process and control according to the transferred signal.

The type-identification unit 28 connects the power module 14 and the control module 10 and can be used for identifying the type of the power module 14, such as the chemical type, voltage type, etc., of the power module 14. The type-identification unit 28 can set identification resistance within the power module 14 and can also be identification circuits set inside or outside the power module 14. Specific to this implementation, the type-identification unit 28 is the identification resistance set within the power module 14, and the control module 10 can obtain the type of the power module 14 by obtaining the resistance values of the type-identification unit 28.

Thanks to the collaboration of the above-described various parts, the invention realizes the returning charging and the over-discharging protection of the battery pack in the returning charging by means of the process described below or the methods.

Figure 6:
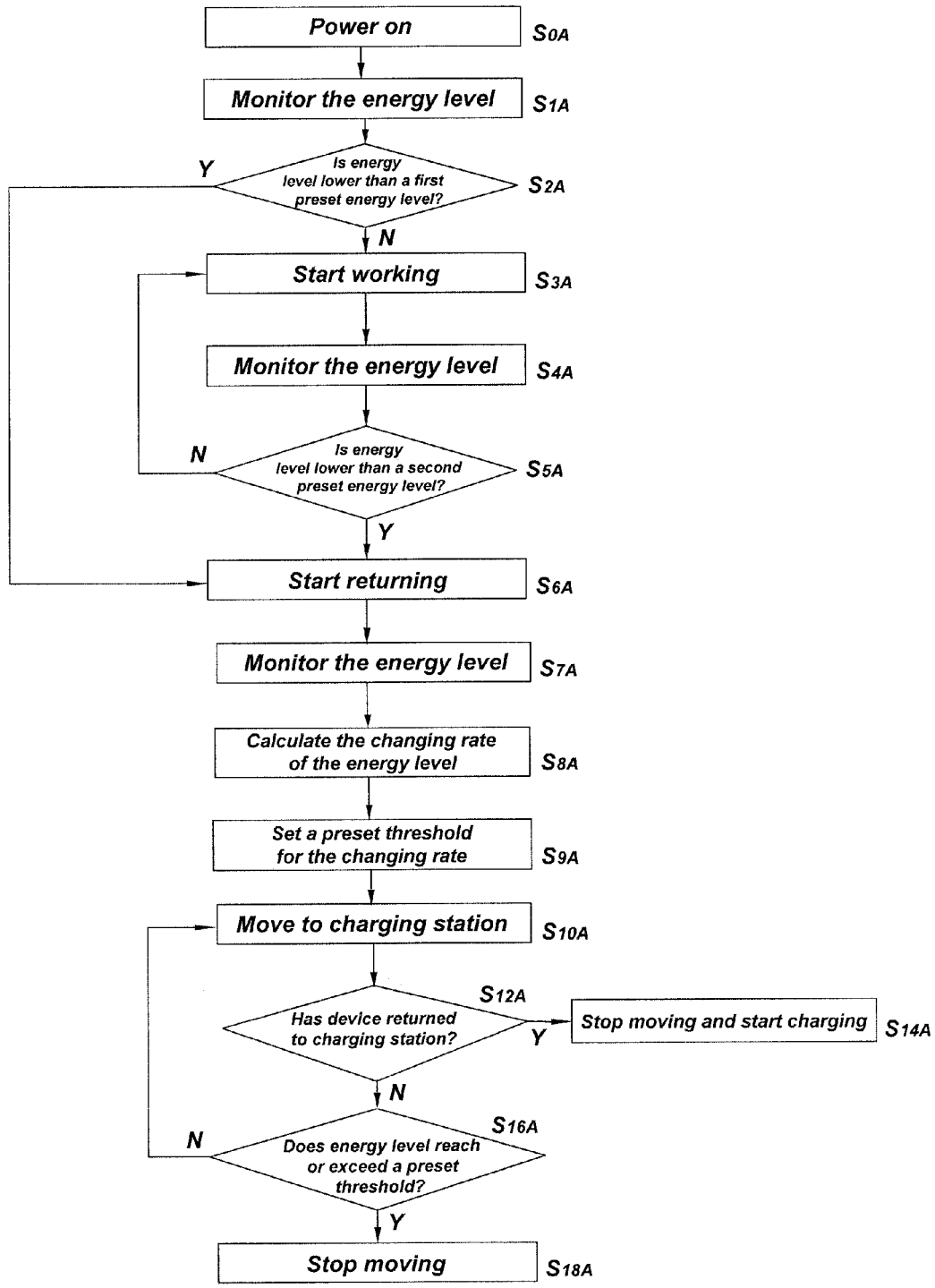
FIG. 6 is a working process of the another embodiment shown in FIG. 5.

The workflow diagram shown in FIG. 6 is suitable for the determination of the returning charging, implementation of the returning charging and battery pack protection in the process of the automatic moving device 2's performing the work, i.e., the process of the working module 16's performing working. It is also suitable for the determination of the returning charging, implementation of the returning charging and battery pack protection at start-up of the automatic moving device 2, i.e., when the module 16 has not started the working.

In the initial step $S_{0A}$, the automatic moving device 2 is in the start-up state, at this time the automatic moving device 2 has not started performing works.

Going to $S_{1A}$, the control module 10 monitors the energy level of the battery pack by the power-detecting unit 18. The energy level of the battery pack can be residual capacity, discharging voltage, discharging current, discharging time, discharging temperature, etc., of the battery pack. The energy level of the battery pack can be the energy level of the whole battery pack, the energy level of one battery cell, the energy level of some battery cells, the energy level of every battery cell or a combination of the energy level described above. As mentioned previously, in this implementation example, the power-detecting unit 18 detects the voltage of the battery pack representing the energy levels of the whole battery pack and sends it to the control module 10.

After $S_{1A}$, go to $S_{2A}$, wherein the control module 10 determines that the energy level of the power module 14 obtained by the power-detecting unit 18 is lower than the first preset energy level. The first preset energy level is pre-stored in the memory 24 of the control module 10. The processor 22 of the control module 10 compares the energy level of the first preset energy level and of the detected power module 14. If the energy level of power source is lower than the first preset energy level, go to $S_{6A}$. In $S_{6A}$, the control module 10 controls the automatic moving device 2 to start returning. If the energy level of the power module 14 is not lower than the first preset energy level, go to $S_{3A}$. As mentioned previously, in this implementation example, because the energy level of the power module 14 is indicated by the whole battery pack voltage, the one stored in the memory 24 is the first preset voltage value. The processor 22 determines the degree relations between the first preset energy level and the detected energy level of the power module 14 by comparing the degree relations between the whole battery pack voltage and the first preset voltage value described. In this implementation example, when the energy level of the power module 14 equals to the first preset energy level, go to $S_{3A}$, but at this time it is practicable if the process goes to $S_{6A}$.

In $S_{3A}$, the control module 10 controls the working module 16 to start working, thus, performing the corresponding works, such as dust absorption tasks or mowing tasks. After $S_{3A}$, go to $S_{4A}$. In $S_{4A}$, the same work is performed as $S_{1A}$, that is, the control module 10 monitors the energy level of the power module 14, i.e., the whole battery pack voltage by the power-detecting unit 18.

After $S_{4A}$, go to $S_{5A}$, wherein the control module 10 determines that the energy level of the power module 14 is lower than the second preset energy level. The second preset energy level is pre-stored in the memory 24 of the control module 10. The processor 22 of the control module 10 compares the energy level of the second preset energy level and the detected energy level of the power module 14. If the energy level of the power module 14 is not lower than the second preset energy level described, go to $S_{3A}$. The automatic moving device 2 continues to work and does not perform other actions. Alternatively, if the energy level of the power source is lower than the second preset energy level described, go to $S_{6A}$, start the action of allowing the automatic moving device 2 to return the charging station. In this implementation example, because the whole battery pack voltage indicates the energy level of the power module 14, the one stored in the memory 24 is the second preset voltage value. The processor 22 determines the degree relations between the second preset energy level and the detected energy level of the power module 14 by comparing the degree relations between the whole battery pack voltage and the first preset voltage value described. In this implementation example, when the energy level of the power module 14 equals to the second preset energy level, go to $S_{3A}$, but at this time it is practicable if the process goes to $S_{6A}$.

As mentioned previously, the memory 24 of the control module 10 stores the first preset energy level and the second preset energy level. The first preset energy level is in the condition that the control module 10 determines that it controls the automatic moving device 2 to start the returning before the working module 16 of the automatic moving device 2 performs the work. The second preset energy level is in the condition that the control module 10 determines that it controls the automatic moving device 2 to start the returning before the working module 16 of the automatic moving device performs the work. The first preset energy level can be the same as the second preset energy level and can be different. If they are the same, the memory 24 of the control module 10 only requires storing one preset energy level. In this case, in $S_{2A}$ and $S_{5A}$, the first preset energy level is used as comparing with the energy level of the detected power module 14 together with the second preset energy level, which is the same preset energy level. Preferably, the first preset energy level is different from the second preset energy level. More preferably, the memory 24 of the control module 10 stores the first preset energy level and the second preset energy level according to different load levels in the power module 14. Because the working module 16 has not started performing the work when the processor 22 compares the energy level of the power module 14 with the first preset energy level, the energy consumption of the automatic moving device 2 on the power module 14 is less and the load level of the power module 14 is less. When the processor 22 compares the energy level 14 of the power source with the second preset energy level, the working module 16 has started to perform working. The energy consumption of the automatic moving device 2 on the power module 14 is more. The load level of the power module 14 is also larger. Therefore, the first preset energy level stored by the memory 24 of the control module 10 is not higher than the energy level of the second preset energy level. When the first preset energy level and the second preset energy level is set, it is considered that the residual energy level of the power module 14 is enough to support the automatic moving device 2 to return to the charging station. In this implementation, the energy required by the automatic moving device 2 for returning to the charging station is about 100 mAh, but the residual energy retained in the power module 14 is 200 mAh when setting the first preset energy level and the second preset energy level to improve the reliability. In an implementation, the power module 14 is a lithium battery pack with a rated voltage of 28 V and 2000 mAh capacity, which has an energy level that goes through the complete voltage-reaction power module 14 for the battery pack. It is obtained from tests that the residual capacity is 200 mAh and the voltage of the whole battery pack is about 24.5 V when the loads are not applied on the battery pack; the residual capacity is 200 mAh, and the voltage of the whole battery pack is about 23 V when about 0.6 A loads are applied. Therefore, the memory 24 of the control module 10 stores the preset voltage value and the second preset voltage value with the two different values, where the first preset voltage is 24.5 V and the second preset voltage is 23 V. Thus, it is clear that, in this implementation, the first preset voltage value and the second preset voltage value are fixed values and the first preset voltage value is lower than the second preset voltage value.

From $S_{0A}$ described above to $S_{5A}$, FIG. 6 depicts that the automatic moving device 2 determines that it starts the returning and the energy level of the power module 14 is lower than the preset energy level. In addition to the modes described above, the returning can be started by receiving the user's returning commands, for example, the forced returning button operated by the user is set on a house of the automatic moving device 2. When users close the forced returning button, the control module 10 can detect that the forced returning button is from "open" to "closed," thus, to identify the user's forced returning command to control the automatic moving device 2 to start returning.

After the control module 10 determines that the energy level of the power module 14 is lower than the preset energy level, the automatic moving device 2 usually stops the operation of the working module 16 in the process of the returning to save energy.

After going to $S_{6A}$, the automatic moving device 2 starts the returning action, i.e., starts returning to the charging station 4. The step after $S_{6A}$ is $S_{7A}$. In $S_{7A}$, the same actions are performed as $S_{1A}$ or $S_{4A}$, that is, the control module 10 monitors the energy level of the power module 14 via the power-detecting unit 18.

After $S_{7A}$, the automatic moving device 2 goes to $S_{8A}$; the control module 10 obtains the energy level of the current power module 14 through power-detecting unit 18 and calculates the changing rate of the energy level according to the current energy level. It may be observed after long-term research that the changing of the energy level is smooth when the power module 14 is in the initial period of discharging, i.e., the residual power level is higher. The changing of the energy level changes dramatically at the end of discharging, i.e., when the residual power level is very low. The changing rates of the energy level in the two stages have a very clear distinction. Therefore, the stage of discharging the power module 14 is obtained by calculating the changing rate of the energy level. Stopping further discharging of the power module 14 may prevent damage to the power module 14 due to over-discharging.

Figure 7:
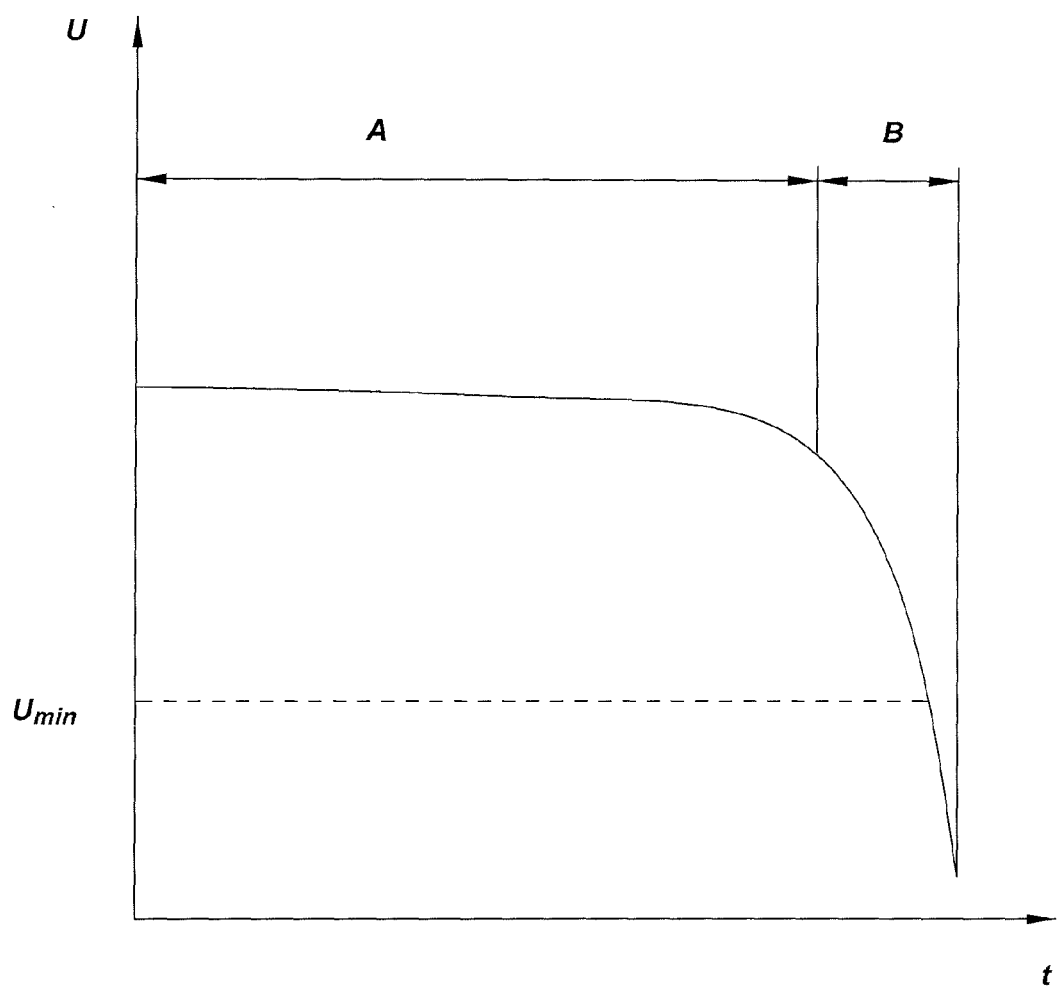
FIG. 7 is a curve chart of a power source discharging of the embodiment shown in FIG. 5.

To further describe the above characteristics; take the changing curve of the voltage in the discharging process of the power module 14 as an example together with FIG. 7 to illustrate. FIG. 7 shows the discharging curve of voltage and time during the discharging of the power module 14. The discharging curve includes A and B, in which the voltage of part A decreases slowly and the voltage of the battery pack is decreased to the cut-off voltage $U_{min}$ in a very short time. When performing discharging on the power module 14 when the voltage is lower than $U_{min}$, it will cause over-discharging on the power module 14 causing damage to the power module 14. As described above, the voltage changes very obviously, therefore, it is obtained that the battery pack is about close to discharging by calculating the changing rate and determining that the rate reaches the preset threshold, thus, performing effective protection on the power module 14. The changing rate of the energy level can be calculated by calculating the first derivative between the energy level of the power module 14 and time t or calculating the second derivative or higher-order derivative between the energy level of the power module 14 and time, in which the second derivative and higher-order derivative changes more significantly relative to the first derivative and is easy to detect. The calculation is relatively complex. The calculation mode of the control module 10 on the energy level of the power module 14 can be realized by the hardware or software. For hardware mode, for example, it can be done via differentiating circuit. For software, for example, it can be done by calculating the changing rate $\Delta p$ of the energy level for the battery pack within a certain continuous interval $\Delta t$, that is, $\Delta p/\Delta t$; or calculate changes of $\Delta p/\Delta t$ in a continuous interval $\Delta t$, that is $d^2p/d^2t$; or calculate changes $d^2p/d^2t$ within a continuous interval $\Delta t$, etc. In this implementation, the changing rate of the energy level of the power module 14 is obtained by calculating the first derivative between the energy level of power module 14 and time. In this implementation, the energy level of the power module 14 is the whole battery pack voltage; the changing rate of the energy level for the power module 14 is the first derivative between the whole battery pack voltage and time. The control module 10 obtains the whole battery pack voltage values by the power-detecting unit 18 and stores them in the memory 24. The processor 22 obtains the whole battery pack voltage values at the first specific time point and the whole battery pack voltage values at the second specific time point after the preset time interval $\Delta t$ from the memory 24. It then calculates the ratio between $\Delta V$ and $\Delta t$, i.e., $\Delta V/\Delta t$, and the first derivative between the energy level of the power source and time is the changing rate of the energy level. Additionally, when the energy level of the power module 14 is indicated by the discharging current, discharging temperature of the power module 14, when loading the specific loads, the curve between the discharging current and time is similar with the curve between voltage and time shown in FIG. 7. When ensuring the specific discharging current, the curve between the discharging temperature and time is similar with the curve between voltage and time shown in FIG. 7. Therefore, when the energy level is indicated by the discharging current, discharging temperature, etc., the time point for stopping discharging on the power module 14 can be determined by calculating the changing rate of the energy levels to realize the protection on the power module 14.

With reference to FIG. 6, and continued reference to FIG. 7, after $S_{8A}$, go to $S_{9A}$. The automatic moving device 2 set a preset threshold for the changing rate of the energy level for the power module 14. As shown in FIG. 7, the energy levels of the power module 14 has changes of the two Stages A and B with the extended working time, in which it is smooth in Stage A and is dramatic in Stage B. However, many parameters have influences on the changes of Stage B, such as the type, load level, discharging temperature, etc., of the power module 14. When the degree of change in Stage B is different, the changing rate of the corresponding energy level at the time point of stopping discharging must be different. Therefore, preferably set the preset thresholds based on the parameters having influences on the changing degree in Stage B, thereby more accurately determining the time point for stopping discharging and better protecting the power source. If there is a possibility for the automatic moving device 2 providing different types of power modules 14 with energies, preferably, set different preset threshold values for different types of power modules 14 when setting the preset threshold values. Alternatively, if the automatic moving device 2 only uses one type of power module 14 for supply sources, it is not necessary to set different preset thresholds according to different types of power modules 14 when the preset threshold is set. Additionally, if the automatic moving device 2 is in the process of returning to the charging station 4, preferably set different preset thresholds according to different load levels when the load levels of the power module 14 change significantly. If the automatic moving device 2 is in the process of returning to the charging station 4, set different preset thresholds according to different load levels when the load levels of the power module 14 change significantly. Whenever the type of the power module 14 is different or the load levels changes a lot, preferably, set the preset threshold according to discharging temperature of the power module 14. Certainly, if the automatic moving device 2 only uses one chemical type of power module 14 for a power supply, the load level of the power module 14 does not change greatly in the process of returning. Alternatively, the automatic moving device 2 uses a different type of power module 14 for a power supply and/or the load levels of the power module 14 change greatly in the process of returning. In some embodiments, the preset threshold is set when the automatic moving device 2 leaves a factory. In the working process of the automatic moving device 2, it is adjusted based on different load levels, type, discharging temperature of the power module 14. When the preset threshold is fixed, $S_{8A}$ can be exempted, that is, after $S_{7A}$, perform $S_{9A}$ without setting $S_{8A}$.

In this implementation, the control module 10 sets the preset threshold based on the type, load levels and discharging temperature of the power module 14. Specifically, the control module 10 detects discharging current of the battery pack by the load-detecting unit 27 and it is 0.6 A to 1 A in this implementation. At this time, the type-identification unit 28 detects the type of the battery pack and it is a lithium battery in this implementation. Additionally, the control module 10 detects the temperature of the power module 14, the operating mode of the temperature-detecting unit is well known by the technicians, for simplicity, it is not shown in the figure. After knowing the discharging current, discharging temperature and type in the battery pack, the preset threshold 0.02 V/s is indicated by the threshold of the memory 24 stored in the control module 10 via the real-time query.

Because in the implementation, the discharging current of power module 14 is detected by the load-detecting unit 27, and the discharging current can also be parameters representing the energy level of power module 14. When the energy level is indicated by the discharging current and the power-detecting unit 18 is set as the discharging current of the power module 14, which can be detected, the function of the load-detecting unit 27 can also be realized by the power-detecting unit 18 directly. Additionally, preferably, the function of the temperature-detecting unit can also be completed by the power-detecting unit 18 directly.

After $S_{9A}$, the automatic moving device 2 goes to $S_{10A}$. For example, it drives the automatic moving device 2 to move toward the charging station 4 to return to the charging station 2. The automatic moving device 2 searches for the guidance signal related to the position of the charging station 4 by the guidance signal-sensing unit 20 and moves to the charging station 4 according to the guidance signal. As mentioned previously, the guidance signal-sensing unit 20 moves toward the charging guide line 6 by sensing the surrounding magnetic signal generated by the electrical signal on the charging guide line 6, then moves toward the charging station along the charging guide line 6.

After performing $S_{10A}$, go to $S_{12A}$. The control module 10 determines that the automatic moving device 2 successfully returns to the charging station 4. It preferably determines that the charging terminals on the automatic moving device 2 are connected with the power terminal on the charging station 4. Usually, the determination is realized by monitoring that the charging terminals described have received the external voltages or signal, and the determination can be performed by other ways such as a position sensor, a crash sensor, etc. If the result is "Yes" and the automatic device 2 returns the charging station 4, go to $S_{14A}$, wherein the control module 10 controls the automatic moving device 2 to stop moving and start charging. If the result is "No," go to $S_{16A}$.

$S_{16A}$ determines if the absolute value of the changing rate of the energy level of the battery pack reaches or exceeds the preset threshold. If the result of $S_{16A}$ is "No," i.e., the absolute value of the changing rate of energy level for the battery pack is lower than the preset threshold, return to $S_{10A}$ and continue to perform the action for returning to the charging station 4. If the result is "Yes," i.e., the changing rate of the energy level for the battery pack reaches or exceeds the preset threshold, go to $S_{18A}$. In $S_{18A}$, the automatic moving device 2 stops moving. Preferably, the control module 10 controls the driving module 12 to stop working.

In the working process shown in FIG. 6, whenever the automatic moving device 2 returns to the charging station 4 successfully, it stops moving after its energy level in the battery pack reaches or exceeds the preset threshold value. That is, if the automatic moving device 2 returns to the charging station 4 successfully before the energy level of the battery pack reaches or exceeds the preset threshold, the automatic moving device 2 stops moving in the charging station 4 and performs charging. If the automatic moving device 2 has not successfully returned to the charging station 4 when the energy level of the battery pack reaches or exceeds the preset threshold, it can stop moving. This working process avoids both the automatic moving device 2 continuously searching for the charging station 4 when it cannot return successfully and damage due to over-discharging of the battery pack.

Preferably, when the determined result of $S_{16A}$ is "Yes," the control module 10 also controls the automatic moving device 2 to send a charging reminder signal to remind users that the automatic moving device 2 will be returning to the charging station 4 with manual assistance. The charging reminder signal can be graphic information displayed on the display panel of the automatic moving device 2, a special alarm sound signal, or information on other devices such as short messages or other reminders sent to the users' mobile phone via a mobile network, etc.

By the working process as described above, the automatic moving device 2 can start returning in good time to power-up and work, according to the energy levels of the battery pack as well as perform the over-discharging protection on the battery pack during the returning.

The chronological description method is used in all steps for describing this procedure. The order of the described method does not represent an order that must be followed strictly and the steps can be adjusted properly as needed. For example, $S_{8A}$ can be set after $S_{9A}$. $S_{10A}$ can also be between $S_{6A}$ and $S_{7A}$. That is, based on the principle of the invention, the technicians in this field can perform proper adjustment on the procedures in this process, which can realize the effect of this invention.

The invention is suitable for the automatic moving device 2 that will be returning to the charging station 4 that performs charging and is also suitable for the automatic moving device 2 of the returning working station or other specific devices. Determining that it returns to the working station or other specific device can be realized by the same way for determining that it returns to the charging station, and also by the automatic moving device 2 reaching the working station or within a specific range of other specific devices, the automatic moving device 2, working station or other specific device send wireless signals for determination mutually.

The invention claimed is:

1. A method for controlling an automatic moving device, comprising:
   monitoring an energy level of a battery pack of an automatic moving device, the automatic moving device comprising the battery pack for providing power and wherein the automatic moving device is adapted to operate in a work area and to automatically return to a charging station for charging;
   moving the automatic moving device toward the charging station if the energy level of the battery pack is less than or equal to a preset energy level; and
   stopping movement of the automatic moving device within a preset length of time from when the energy level of the battery pack is less than or equal to the preset energy level.

2. The method according to claim 1, further comprising selecting the preset length of time according to the monitored energy level.

3. The method according to claim 2, wherein selecting the preset length of time comprises calculating a difference between the monitored energy level and the preset energy level and setting the preset length of time according to the difference.

4. The method according to claim 1, wherein monitoring the energy level of the battery pack comprises:
   monitoring a voltage value of the battery pack; and
   determining whether the voltage value of the battery pack is less than or equal to a preset voltage value to determine whether the energy level of the battery pack is less than or equal to the preset energy level.

5. The method according to claim 4, further comprising selecting the preset length of time according to the voltage value of the battery pack.

6. The method according to claim 1, further comprising stopping movement of the automatic moving device and starting charging of the battery pack if the device returns to the charging station within the preset length of time.

7. The method according to claim 1, further comprising transmitting a charging reminder signal if the automatic moving device does not return to the charging station within the preset length of time.

8. The method according to claim 1, wherein moving the automatic moving device toward the charging station comprises:
   searching for a guidance signal related to a position of the charging station; and
   moving the automatic moving device toward the charging station according to the guidance signal.

9. The method according to claim 8, wherein the guidance signal comprises an electrical signal on a charging guide line, wherein the charging guide line is connected to the charging station, and wherein moving the automatic moving device toward the charging station further comprises:
   searching for the electrical signal;
   moving the automatic moving device toward the charging guide line according to the electrical signal; and
   moving the automatic moving device toward the charging station along the charging guide line according to the electrical signal.

10. The method according to claim 1, further comprising causing the automatic moving device to perform at least one of dust collection and mowing.

11. An automatic moving device, comprising:
a driving module configured to drive the automatic moving device, the driving module comprising a motor and wheels configured to be driven by the motor;
a power module configured to supply energy to the driving module, the power module comprising a battery pack and charging terminals connected to the battery pack;
a control module connected to the driving module, the control module configured to provide at least one signal to the driving module; and
a power-detecting unit configured to detect an energy level of the battery pack and transmit a signal corresponding to the energy level of the battery pack to the control module, wherein:
when the energy level of the battery pack is less than or equal to a preset energy level, the control module is configured to send a signal to the driving module to move the automatic moving device toward a charging station; and after a preset length of time from when the energy level of the battery pack is less than or equal to the preset energy level, the control module is configured to send a signal to the driving module to stop moving the automatic moving device.

12. A device according to claim 11, wherein the control module is configured to set the preset length of time according to the energy level of the battery pack.

13. A device according to claim 12, wherein the control module is configured to calculate a difference between the energy level of the battery pack and the preset energy level, and wherein the control module is configured to set the preset length of time according to the difference.

14. A device according to claim 11, wherein the power-detecting unit is configured to monitor the energy level of the battery pack by monitoring a voltage of the battery pack; and wherein if the voltage value of the battery pack is less than or equal to a preset voltage value, then the control module is configured to determine that the energy level of the battery pack is less than or equal to the preset energy level.

15. A device according to claim 14, wherein the control module is configured to set the preset length of time according to the monitored voltage value.

16. A device according to claim 11, wherein if the automatic moving device returns to the charging station within the preset length of time, the control module is configured to send a signal to the driving module to stop moving the device and wherein the control module is configured to initiate charging of the battery pack.

17. A device according to claim 11, wherein the control module is configured to send a charging reminder signal if the automatic moving device does not return to the charging station within the preset length of time.

18. A device according to claim 11, further comprising a guidance signal-sensing unit in communication with the control module, the guidance signal-sensing unit configured to sense a guidance signal related to the position of the charging station, wherein the control module is configured to control the driving module according to the guidance signal to move the automatic moving device toward the charging station.

19. A device according to claim 18, wherein the guidance signal-sensing unit is configured to sense an electrical signal on a charging guide line connected to the charging station; wherein when the guidance signal-sensing unit senses the electrical signal, the control module is configured to send a signal to the driving module to move the automatic moving device toward the charging guide line and move the automatic moving device toward the charging station along the charging guide line according to the sensed electrical signal.

20. A device according to claim 11, further comprising a working module configured to receive energy from the power module and configured to perform at least one of dust collection and mowing.

* * * * *

UNITED STATES PATENT AND TRADEMARK OFFICE
CERTIFICATE OF CORRECTION

PATENT NO. : 9,440,350 B2  
APPLICATION NO. : 14/382441  
DATED : September 13, 2016  
INVENTOR(S) : Guoliang Mou et al.

Page 1 of 1

It is certified that error appears in the above-identified patent and that said Letters Patent is hereby corrected as shown below:

In the Specification

| | | |
|---|---|---|
| Column 6, | Line 48, | change "to perfoini mowing" to --to perform mowing-- |
| Column 16, | Line 34, | change "the deter mined result" to --the determined result-- |

Signed and Sealed this  
Twenty-fourth Day of January, 2017

Michelle K. Lee  
*Director of the United States Patent and Trademark Office*